(12) United States Patent
Liu et al.

(10) Patent No.: US 9,531,932 B2
(45) Date of Patent: Dec. 27, 2016

(54) CAMERA MODULE FOR PORTABLE DEVICE

(71) Applicant: HTC CORPORATION, Taoyuan (TW)

(72) Inventors: Hsin-Chih Liu, Taoyuan (TW); Yu-Jing Liao, Taoyuan (TW); Ying-Yen Cheng, Taoyuan (TW); Yin-Chou Chen, Taoyuan (TW); I-Cheng Chuang, Taoyuan (TW); Chia-Huan Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/928,804

(22) Filed: Oct. 30, 2015

(65) Prior Publication Data

US 2016/0057326 A1 Feb. 25, 2016

Related U.S. Application Data

(63) Continuation of application No. 13/710,123, filed on Dec. 10, 2012, now Pat. No. 9,210,311.

(60) Provisional application No. 61/621,074, filed on Apr. 6, 2012.

(51) Int. Cl.
*H04N 5/225* (2006.01)
*H04N 21/4223* (2011.01)

(52) U.S. Cl.
CPC .......... *H04N 5/2257* (2013.01); *H04N 5/2252* (2013.01); *H04N 5/2253* (2013.01); *H04N 21/4223* (2013.01)

(58) Field of Classification Search
CPC .......................... H04N 5/2257; H04M 1/0264
See application file for complete search history.

(56) References Cited

U.S. PATENT DOCUMENTS

| | | |
|---|---|---|
| 2004/0106440 A1 | 6/2004 | Haruyama |
| 2005/0062083 A1 | 3/2005 | You et al. |
| 2005/0174468 A1 | 8/2005 | Herranen et al. |
| 2005/0248684 A1 | 11/2005 | Machida |
| 2006/0029385 A1 | 2/2006 | Huang |
| 2006/0056060 A1 | 3/2006 | Ozaki et al. |
| 2006/0062100 A1 | 3/2006 | Takahashi et al. |
| 2008/0252775 A1 | 10/2008 | Ryu et al. |
| 2009/0021624 A1* | 1/2009 | Westerweck ........... G03B 17/28 348/308 |
| 2009/0021635 A1 | 1/2009 | Cheng |
| 2012/0014687 A1 | 1/2012 | Sanford |

* cited by examiner

*Primary Examiner* — Twyler Haskins
*Assistant Examiner* — Dwight C Tejano
(74) *Attorney, Agent, or Firm* — Birch, Stewart, Kolasch & Birch, LLP

(57) ABSTRACT

A camera module is provided. The camera module includes a camera device and a support ring. The camera device includes a substrate, an image sensor device on the substrate, and a holder for covering the image sensor device, wherein the holder includes a side portion placed around the image sensor device. The support ring is fixed to and laterally extends from the side portion of the holder, and is attached onto a wall portion of the chassis. A portable device with the camera module is also disclosed.

5 Claims, 4 Drawing Sheets

CAMERA MODULE FOR PORTABLE DEVICE

CROSS REFERENCE TO RELATED APPLICATIONS

This application is a Continuation Application of co-pending application Ser. No. 13/710,123, filed on Dec. 10, 2012, which claims the benefit of U.S. Provisional Application No. 61/621,074, filed on Apr. 6, 2012. The entire contents of each of the above applications are hereby incorporated by reference.

BACKGROUND OF THE INVENTION

Field of the Invention

The invention relates to optical imaging technology, and in particular to a camera module for a mobile phone.

Description of the Related Art

Recently, with the development of optical imaging technology, more and more portable devices, such as digital cameras, mobile phones and the like, have become increasingly popular. In particular, mobile communication devices are equipped with camera modules for capturing picture and video, such as camera phones, and are widely used. Nowadays, the camera phone further includes a touch panel display device placed at a front side of the camera phone opposite to the camera module that is placed at a backside of the camera phone.

In a typically camera phone, however, a portion of the camera module may protrude from the housing of the camera phone. Such a protrusion of the camera module is detrimental for providing a camera phone with a flatter and thinner profile. Moreover, such a protrusion of the camera module detracts from the appearance of the camera phone.

Accordingly, there exists a need in the art for development of a novel camera module, capable of mitigating or eliminating the aforementioned problems.

BRIEF SUMMARY OF THE INVENTION

A detailed description is given in the following embodiments with reference to the accompanying drawings. A camera module in a chassis and a portable device are provided. An exemplary embodiment of a camera module comprises a camera device and a support ring. The camera device comprises a substrate, an image sensor device on the substrate, and a holder for covering the image sensor device, wherein the holder includes a side portion placed around the image sensor device. The support ring is fixed to and laterally extends from the side portion of the holder, and is attached onto a wall portion of the chassis.

An exemplary embodiment of a portable device comprises a display module, a housing, a printed circuit board, a chassis and a camera module. The housing has an aperture and covers the display module. The printed circuit board is disposed between the display module and the housing and has a through hole. The chassis comprises a wall portion and a plate portion with a through hole. The wall portion is on the plate portion and along a periphery of the through hole of the plate portion and passes through the through hole of the printed circuit board to create a cavity corresponding to the aperture. The camera module is attached onto the wall portion of the chassis. The camera module comprises a camera device and a support ring. The camera device is disposed in the cavity of the chassis. The support ring is fixed to and laterally extends from a side portion of the camera device.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

The following embodiments disclose a camera module and a portable device using the same, which are capable of eliminating the protrusion of the camera module, thereby providing a portable device with a flatter and thinner profile.

Figure 1:
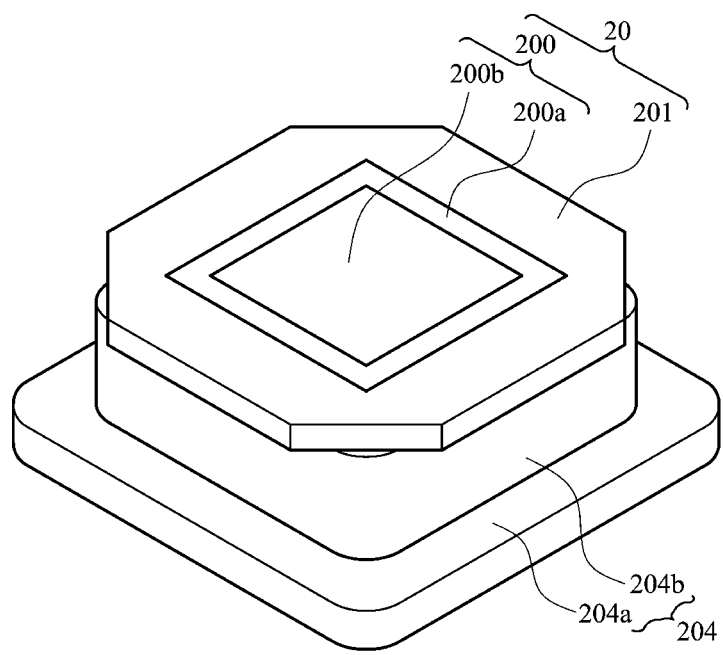
FIG. 1 is a perspective diagram of an exemplary embodiment of a camera module attached onto a chassis according to the invention.
Figure 2A:
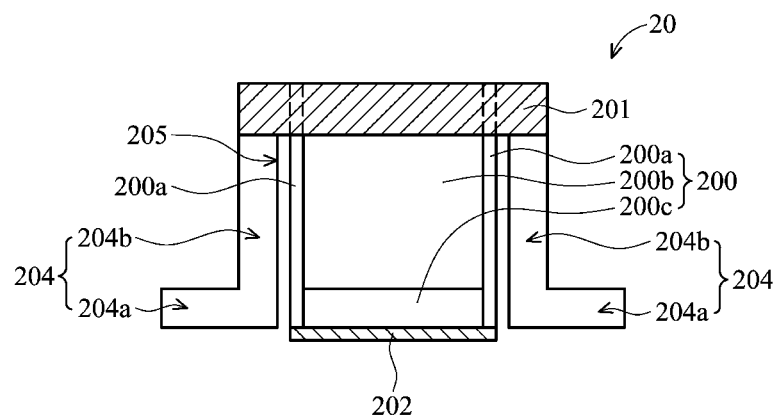
FIG. 2A is a cross section of the camera module attached onto a chassis shown in FIG. 1.

Refer to FIGS. 1 and 2A, in which FIG. 1 illustrates a perspective diagram of a camera module 20 attached onto a chassis 204 according to an exemplary embodiment of the present disclosure and FIG. 2A illustrates a cross section of a camera module 20 attached onto a chassis 204 shown in FIG. 1. The camera module 20 comprises a camera device 200, a support ring 201, and a conductive buffer pad 202. Typically, a camera device may comprise a substrate, an image sensor device, a lens set, a flexible printed circuit (FPC) and a holder. The image sensor device, such as a CCD or CMOS, is disposed on the substrate and is used for converting the incident light into an electric signal and outputting the electric signal. The lens set is disposed above the image sensor device for focusing the incident light onto the image sensor device. The FPC is used for receiving the electric signal from the image sensor device and outputting the received electric signal to an external circuit. The holder is used for covering and holding the image sensor device and the overlying lens set. Moreover, the holder may comprise a side portion placed around the image sensor device and the substrate. In order to simplify the diagram, only a holder portion 200a, an image sensor device 200b and a substrate 200c are depicted as representing the camera device 200.

The support ring 201 is fixed to and laterally extends from the side portion of the camera device 200. For example, the support ring 201 is fixed to and laterally extends from an outer circumference of the side portion of the holder 200a, such that the support ring 201 encloses an upper portion of the holder 200a and is in direct contact with the side portion of the holder 200a. As a result, the upper portion of the camera device 200 is also enclosed by the support ring 201. In the embodiment, the support ring 201 may comprise metal or plastic. Moreover, the support ring 201 may comprise a material which is the same as or different from that of the holder 200a of the camera device 200. Additionally, an outer circumference of the support ring 201 may have an octagonal profile, as shown in FIG. 1. However, it is appreciated that the outer circumference of the support ring 201 may have other profiles, such as a circular, triangular, squared, rectangular, pentagonal, hexagonal or polygonal profile.

The conductive buffer pad 202, such as a gasket, is attached onto a lower surface of the substrate 200c of the camera device 200 to serve as a portion of grounding path for electromagnetic interference (EMI) protection of the camera device 200.

In the embodiment, the chassis 204 comprises a plate portion 204a and a wall portion 204b. The plate portion 204a has a through hole. The wall portion 204b is on the upper surface of the plate portion 204a and along the periphery of the through hole of the plate portion 204a, so as to create a cavity 205 in the chassis 204 for placement of the camera device 200. When the camera device 200 is placed into the cavity 205 of the chassis 204, the support ring 201 attached onto the upper portion of the camera device 200 forms a flange. The flange is laterally extended from the outer circumference of the holder 200a of the camera device 200, to contact an upper surface of the wall portion 204b of the chassis 204, such that the camera device 200 attached to the support ring 201 can be supported by the chassis 204, so as to prevent the camera device 200 from dropping out from the cavity 205 of the chassis 204. Moreover, a lower portion of the camera device 200 can be further inserted into the through hole of the plate portion 204a of the chassis 204. As a result, a protruding amount of the camera module 20 can be reduced or fully eliminated.

Figure 2B:
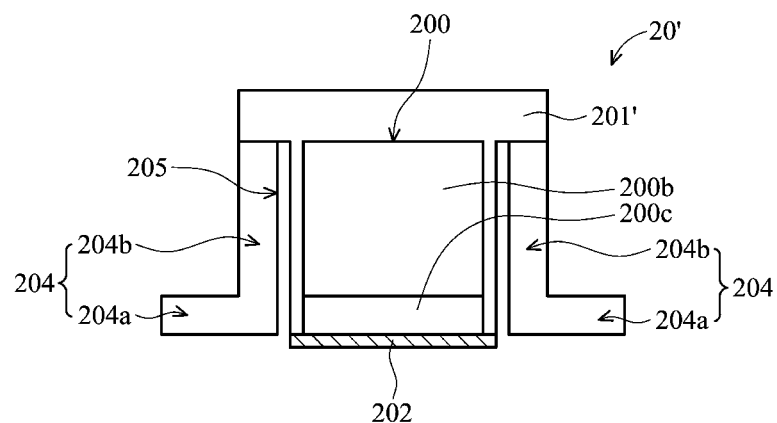
FIG. 2B is a cross section of another exemplary embodiment of a camera module attached onto a chassis according to the invention.

Refer to FIG. 2B, which illustrates a cross section of a camera module 20' attached onto a chassis 204 according to another exemplary embodiment of the present disclosure. Elements in FIG. 2B that are the same as those in FIG. 2A are labeled with the same reference numbers as in FIG. 2A and are not described again for brevity. In the embodiment, the camera module 20' has a structure similar to the camera module 20 shown in FIG. 2A except that the support ring is integrally formed with the holder of the camera device 200 and is labeled with 201'.

Figure 3:
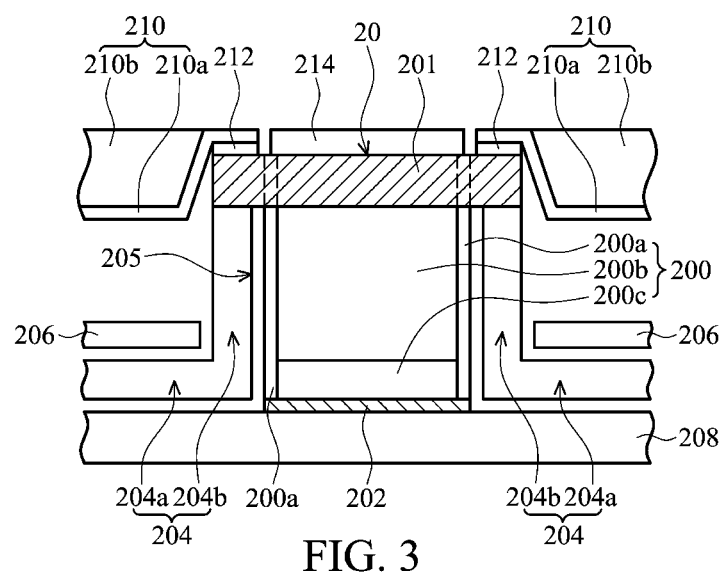
FIGS. 3 to 6 are cross sections of various exemplary embodiments of a portable device with a camera module according to the invention.

FIGS. 3 to 6 illustrate cross sections of various exemplary embodiments of a portable device with a camera module according to the present disclosure. Elements in FIGS. 3 to 6 that are the same as those in FIG. 2A are labeled with the same reference numbers as in FIG. 2A and are not described again for brevity. Referring to FIG. 3, a portable device, such as a mobile phone, comprises a display module 208, a housing 210, a printed circuit board (PCB) 206, a chassis 204, and a camera module 20. The display module 208 may comprise, for example, a liquid crystal display (LCD) device, an organic light-emitting display (OLED) device, an MEMS display module, or an electrophoretic display (EPD) device. In some embodiments, the display module 208 may further comprise a touch sensing module (which is also referred to as a touch window) integrated into the display module to form a touch panel display.

The housing 210 has an aperture and covers the display module 208. In the embodiment, the housing 210 comprises a multilayer structure. For example, the housing 210 may comprises a first layer 210a and a second layer 210b on the first layer 210a. In one embodiment, the first layer 210a may comprise metal and the second layer 20b may comprise plastic.

The PCB 206 is disposed between a non-viewing side of the display module 208 and the housing 210 and may be fixed to the housing 210. The PCB 206 has a through hole to expose a region of the display module 208 where a camera module 20 is mounted thereon.

The chassis 204 comprises a plate portion 204a with a through hole and a wall portion 204b, wherein the plate portion 204a of the chassis 204 is interposed between the PCB 206 and the display module 208 and is fixed to the housing 210 or the PCB 206. Moreover, the wall portion 204b is on the upper surface of the plate portion 204a and along the periphery of the through hole of the plate portion 204a and passes through the through hole of the PCB 206, so as to create a cavity 205 in the chassis 204 and corresponding to the aperture of the housing 210. The chassis 204 may be composed of metal, such as aluminum, copper, an alloy thereof, or combinations thereof, and the like.

The camera module 20 is attached onto the wall portion of the 204b of the chassis 204. Moreover, the camera module 20 has a lower surface attached onto the display module 208 by the conductive buffer pad 202. The camera device 200 of the camera module 20 is disposed in the cavity 205 of the chassis 204. Moreover, the support ring 201 of the camera module 20 is fixed to and laterally extends from the side portion of the camera device 200, such that the support ring 201 of the camera module 20 encloses the upper portion of the camera device 200 and is laterally extended from an outer circumference of the camera device 200 to an upper surface of the wall portion 204b of the chassis 204. The camera module 20 is electrically connected to the PCB 206 by the FPC (not shown) of the camera device 2000. Moreover, the conductive buffer pad 202 is electrically connected to the grounding pad (not shown) of the display module 208, thereby accomplishing EMI protection of the camera module 20.

In one embodiment, the wall portion 204b has an open ring profile as viewed from a top-view perspective, such that an FPC (not shown) of the camera device 200 can be laterally extended to outside of the chassis 204 from the cavity 205. This is convenient for electrically connecting the camera device 200 to an external circuit (not shown) via the FPC. In another embodiment, the wall portion 204b has a closed ring profile as viewed from a top-view perspective. In this case, the wall portion 204b further comprises a through hole, such that the FPC of the camera device 200 can be laterally extended to outside of the chassis 204 from the cavity 205.

An optional protective lens 214 may be in the aperture of the housing 210 to cover the camera module 20. For example, the protective lens 214 may be attached onto the support ring 201 of the camera module 20 by an adhesive layer (not shown), such as a tape, to cover the camera device 200. Moreover, a sponge 212, which has a ring profile as viewed from a top-view perspective, may be optionally interposed between the housing 210 and the support ring 201 of the camera module 20 to serve as a shock absorber. Since the protruding amount of the camera module 20 can be reduced or fully eliminated, the upper surface of the protective lens 214 can be substantially level with or lower than the outer surface of the housing 210.

Figure 4:
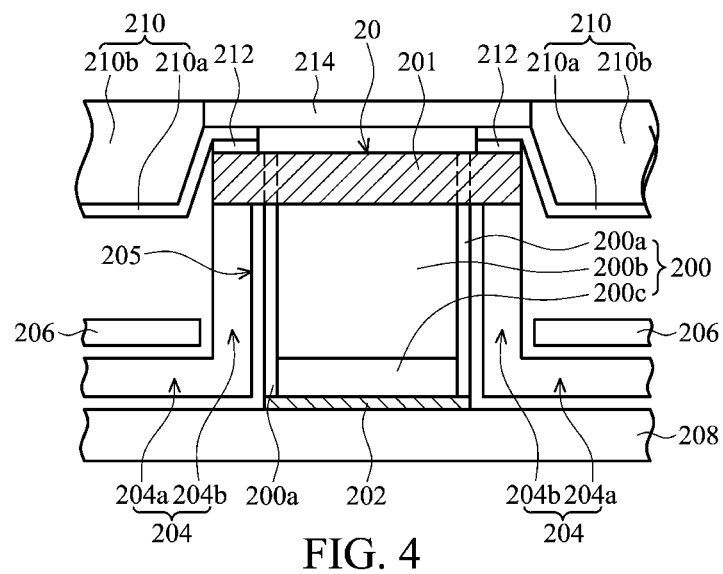

Referring to FIG. 4, the portable device has a structure similar to the structure shown in FIG. 3 except for the position of the protective lens 214. In the embodiment, the protective lens 214 is not in direct contact with the support ring 201 of the camera module 20, but is disposed on a surrounding portion of the housing 210, which circumscribes the aperture of the housing 210. For example, the protective lens 214 is disposed on a portion of the first layer 210a of the housing 210 and is enclosed by the second layer 210b of the housing 210. In the embodiment, the upper surface of the protective lens 214 also can be substantially level with or lower than the outer surface of the housing 210.

Figure 5:
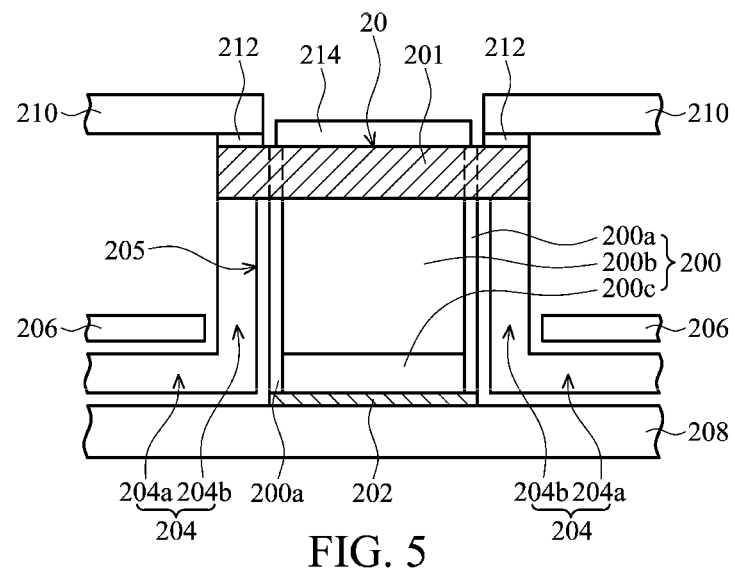

Referring to FIG. 5, the portable device has a structure similar to the structure shown in FIG. 3 except for the structure of the housing 210. In the embodiment, the housing 210 has a single layer structure and may comprise metal or plastic. In the embodiment, the upper surface of the protective lens 214 can also be substantially level with or lower than the outer surface of the housing 210.

Figure 6:
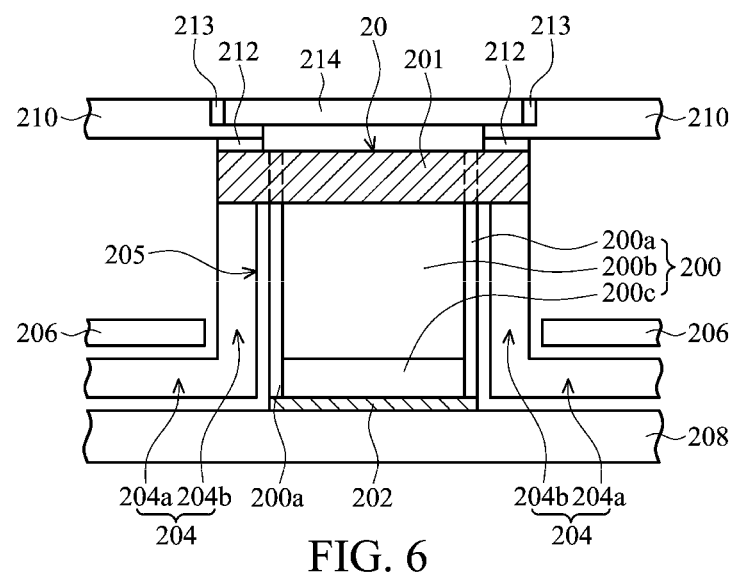

Referring to FIG. 6, the portable device has a structure similar to the structure shown in FIG. 5 except for the position of the protective lens 214. In the embodiment, the protective lens 214 is not in direct contact with the support ring 201 of the camera module 20, but is disposed on a surrounding portion of the housing 210, which circumscribes the aperture of the housing 210. Moreover, a camera ring 213 may be optionally interposed between the protective lens 214 and the housing 210. In the embodiment, the upper surface of the protective lens 214 also can be substantially level with or lower than the outer surface of the housing 210.

It is noted that although the portable devices shown in FIGS. 3 to 6 are equipped with the camera module 20 shown in FIG. 2A, it is appreciated that these portable devices may be equipped with the camera module 20' shown in FIG. 2B to obtain the same or similar advantages achieved in the embodiments of FIGS. 3 to 6.

According to the foregoing embodiments, since a protruding amount of the camera module 20 can be reduced or fully eliminated by partially inserting the camera device 200 into the through hole of the plate portion 204a of the chassis 204, a mobile phone with a flatter and thinner profile can be accomplished and the appearance thereof can be embellished. Moreover, since the conductive buffer pad 202 is directly electrically connected to the display module 208, the grounding path can be shortened to improve EMI protection performance.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera module, comprising:
    a camera device, comprising:
        a substrate;
        an image sensor device disposed on the substrate to capture images; and
        a holder for covering the image sensor device, comprising a side portion placed around the image sensor device and the substrate, wherein the side portion of the holder extends from a bottom surface of the substrate to an upper surface of the image sensor device; and
        a support ring undetachably and directly fixed to and extending radially outward from the side portion of the holder in a lateral direction, and attached onto a wall portion of a chassis,
        wherein the support ring is located on top of a top surface of the chassis.

2. The camera module of claim 1, wherein the support ring encloses an upper portion of the holder.

3. The camera module of claim 1, further comprising a conductive buffer pad attached onto a lower surface of the substrate.

4. The camera module of claim 1, wherein the holder is integrally formed with the support ring.

5. The camera module of claim 1, wherein the support ring is fixed to and laterally extending from an outer circumference of the side portion of the holder, and an outer circumference of the support ring has an octagonal, circular, triangular, squared, rectangular, pentagonal, hexagonal or polygonal profile.

* * * * *